United States Patent
Su et al.

(10) Patent No.: US 11,128,844 B2
(45) Date of Patent: Sep. 21, 2021

(54) PROJECTION APPARATUS AND PROJECTION METHOD THEREOF

(71) Applicant: Coretronic Corporation, Hsin-Chu (TW)

(72) Inventors: Yen-Hsien Su, Hsinchu (TW); Yi-Chang Tsai, Hsinchu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 16/579,780

(22) Filed: Sep. 23, 2019

(65) Prior Publication Data
US 2020/0099900 A1    Mar. 26, 2020

(30) Foreign Application Priority Data

Sep. 26, 2018  (CN) .......................... 201811123430.7

(51) Int. Cl.
*H04N 9/31* (2006.01)
(52) U.S. Cl.
CPC ......... *H04N 9/3108* (2013.01); *H04N 9/3155* (2013.01); *H04N 9/3179* (2013.01); *H04N 9/3152* (2013.01)
(58) Field of Classification Search
CPC .. H04N 9/3188; H04N 9/3155; H04N 9/3108; H04N 9/3179; H04N 9/3152; H04N 9/31; H04N 7/01; H04N 7/0127; G09G 2340/0407; G09G 2340/0435

USPC .............. 348/744, 759, 443, 441, 458, 459; 345/204, 698; 353/31, 84
See application file for complete search history.

(56) References Cited

U.S. PATENT DOCUMENTS

| 9,984,638 B2 * | 5/2018 | Yang | G09G 3/3648 |
| 2005/0243100 A1 * | 11/2005 | Childers | G09G 3/2022 |
| | | | 345/589 |
| 2007/0063996 A1 * | 3/2007 | Childers | G09G 3/3413 |
| | | | 345/204 |
| 2016/0037147 A1 * | 2/2016 | Kempf | H04N 9/3188 |
| | | | 348/744 |

FOREIGN PATENT DOCUMENTS

TW    201518846    5/2015

* cited by examiner

*Primary Examiner* — Sherrie Hsia
(74) *Attorney, Agent, or Firm* — JCIPRNET

(57) ABSTRACT

A projection apparatus and a projection method thereof are provided. The projection apparatus includes a frame refresh rate conversion chip, a spatial light modulation circuit and a control circuit. The frame refresh rate conversion chip performs frame refresh rate conversion on a first video signal to generate a second video signal. The control circuit is coupled to the frame refresh rate conversion chip and the spatial light modulation circuit, and adjusts a resolution and a frame refresh rate of a projected image generated by the spatial light modulation circuit according to a frame refresh rate of the second video signal.

13 Claims, 4 Drawing Sheets

PROJECTION APPARATUS AND PROJECTION METHOD THEREOF

CROSS-REFERENCE TO RELATED APPLICATION

This application claims the priority benefit of China application serial no. 201811123430.7, filed on Sep. 26, 2018. The entirety of the above-mentioned patent application is hereby incorporated by reference herein and made a part of this specification.

BACKGROUND OF THE INVENTION

Field of the Invention

The invention relates to a display device, and particularly relates to a projection apparatus and a projection method thereof.

Description of Related Art

A projection apparatus is a display apparatus used for producing large size images. An imaging principle of the projection apparatus is to convert an illumination beam generated by a light source module into an image beam through a light valve, and project the image beam onto a screen or a wall through a projection lens to form an image. Along with development of projection technology and reduction of fabrication cost, usage of the projection apparatus has gradually extended from commercial use to family use.

In a current 4K projector, only an image signal with a resolution of 1080P and a frame refresh rate of 60 Hz can be received, and under a framework of the 4K projector, a time interval that the image signal with the resolution of 1080P and the frame refresh rate of 60 Hz is input to the 4K projector from an image source (for example, a computer) until it is converted into an output signal for outputting to a light valve may have a delay time of 83.2 ms, which results in a delay phenomenon of a projected image to influence usage quality of the 4K projector. For example, when the 4K projector is used for displaying a game image, the delay phenomenon of the projected image may result in the fact that a player is unable to react immediately to an event of the game content, which influences playing quality of the game.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention is directed to a projection apparatus and a projection method thereof, which are adapted to effectively mitigate a delay phenomenon of a projected image, so as to improve usage quality of the projection apparatus.

Other objects and advantages of the invention may be further illustrated by the technical features broadly embodied and described as follows.

In order to achieve one or a portion of or all of the objects or other objects, an embodiment of the invention provides a projection apparatus including a frame refresh rate conversion chip, a spatial light modulation circuit and a control circuit. The frame refresh rate conversion chip performs frame refresh rate conversion on a first video signal to generate a second video signal. The control circuit is coupled to the frame refresh rate conversion chip and the spatial light modulation circuit, and adjusts a resolution and a frame refresh rate of a projected image generated by the spatial light modulation circuit according to a frame refresh rate of the second video signal.

The invention further provides a projection method of a projection apparatus, where the projection apparatus includes a spatial light modulation circuit, and the projection method of the projection apparatus includes: determining a frame refresh rate of a video signal; and controlling a resolution and a frame refresh rate of a projected image generated by the spatial light modulation circuit according to the frame refresh rate of the video signal.

According to the above description, the resolution and the frame refresh rate of the projected image generated by the spatial light modulation circuit are controlled according to the frame refresh rate of the video signal, so as to reduce the delay time of the projected image according to an application of the projection apparatus, which may effectively improve the usage quality of the projection apparatus.

In order to make the aforementioned and other features and advantages of the invention comprehensible, several exemplary embodiments accompanied with figures are described in detail below.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "left," "right," "front," "back,"

etc., is used with reference to the orientation of the Figure(s) being described and are not intended to be limiting of the invention.

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
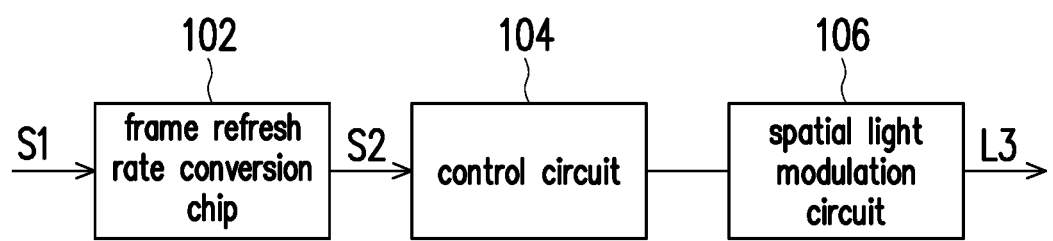
FIG. 1 is a schematic diagram of a projection apparatus according to an embodiment of the invention.

FIG. 1 is a schematic diagram of a projection apparatus according to an embodiment of the invention. Referring to FIG. 1, the projection apparatus 100 includes a frame refresh rate conversion chip 102, a control circuit 104 and a spatial light modulation circuit 106. The control circuit 104 is coupled to the frame refresh rate conversion chip 102 and the spatial light modulation circuit 106. The term "couple" is defined as electrical connection. The frame refresh rate conversion chip 102 may be implemented by a MSD6A838 chip (a manufacturer thereof is MStar Semiconductor, Inc.), though the invention is not limited thereto, and the frame refresh rate conversion chip 102 is capable of processing video signals with a resolution of 1080P (1920×1080 pixels) and a frame refresh rate of 240 Hz. The frame refresh rate conversion chip 102 may perform frame refresh rate conversion on a video signal S1 (a first video signal) to generate a video signal S2 (a second video signal), where a frame refresh rate of the video signal S2 may be equal to or smaller than a frame refresh rate of the video signal S1, for example, the video signal S1 is, for example, a video signal with a resolution of 1080P and a frame refresh rate of 240 Hz, and the video signal S2 is, for example, a video signal with a resolution of 1080P and a frame refresh rate of 240 Hz, or a video signal with a resolution of 1080P and a frame refresh rate of 60 Hz, which is not limited by the invention.

The control circuit 104 is configured to adjust a resolution and a frame refresh rate of a projected image L3 generated by the spatial light modulation circuit 106 according to the frame refresh rate of the second video signal S2, so as to adjust a projection mode of the projection apparatus 100 according to a usage demand of a user. For example, when the user wants to view the projected image in a higher resolution, the frame refresh rate conversion chip 102 may convert the video signal S1 into the video signal S2 with a lower frame refresh rate, for example, convert the video signal S1 into the video signal S2 with the resolution of 1080P and the frame refresh rate of 60 Hz. The control circuit 104 may determine whether the video signal S2 belongs to a video signal with a lower frame refresh rate (a first predetermined frame refresh rate) or a video signal with a higher frame refresh rate (a second predetermined frame refresh rate) according to the frame refresh rate of the video signal S2, and when the control circuit 104 determines that the frame refresh rate of the video signal S2 is equal to the first predetermined frame refresh rate, the control circuit 104 projects an image frame with a high resolution and a lower frame refresh rate according to the video signal S2, for example, an image frame with a resolution of 4K2K (4096× 2160 pixels) and a frame refresh rate of 60 Hz.

Similarly, when the user wants to view the projected image in a higher frame refresh rate, the frame refresh rate conversion chip 102 may convert the video signal S1 into the video signal S2 with a higher frame refresh rate (the second predetermined frame refresh rate), for example, convert the video signal S1 into the video signal S2 with the resolution of 1080P and the frame refresh rate of 240 Hz. When the control circuit 104 determines that the frame refresh rate of the video signal S2 is equal to the second predetermined frame refresh rate, the control circuit 104 projects an image frame with a lower resolution and a high frame refresh rate according to the video signal S2, for example, an image frame with the resolution of 1080P and the frame refresh rate of 240 Hz. Since the frame refresh rate conversion chip 102 and the control circuit 104 are all capable of processing the video signals with the high frame refresh rate (for example, 240 Hz), a time required by the projection apparatus 100 for generating the projected image L3 according to the video signal S1 may be greatly reduced, and the projection apparatus 100 may effectively mitigate an image delay phenomenon under an application circumstance of requiring a higher frame refresh rate, for example, an application circumstance of displaying a game image, so as to avoid influencing the playing quality of the game.

In this way, by using the control circuit 104 to adjust the resolution and the frame refresh rate of the projected image L3 generated by the spatial light modulation circuit 106 according to the frame refresh rate of the video signal S2, the projection mode of the projection apparatus 100 may be adjusted according to the usage demand of the user, so as to effectively provide an additional usage feature to the projection apparatus.

Figure 2:
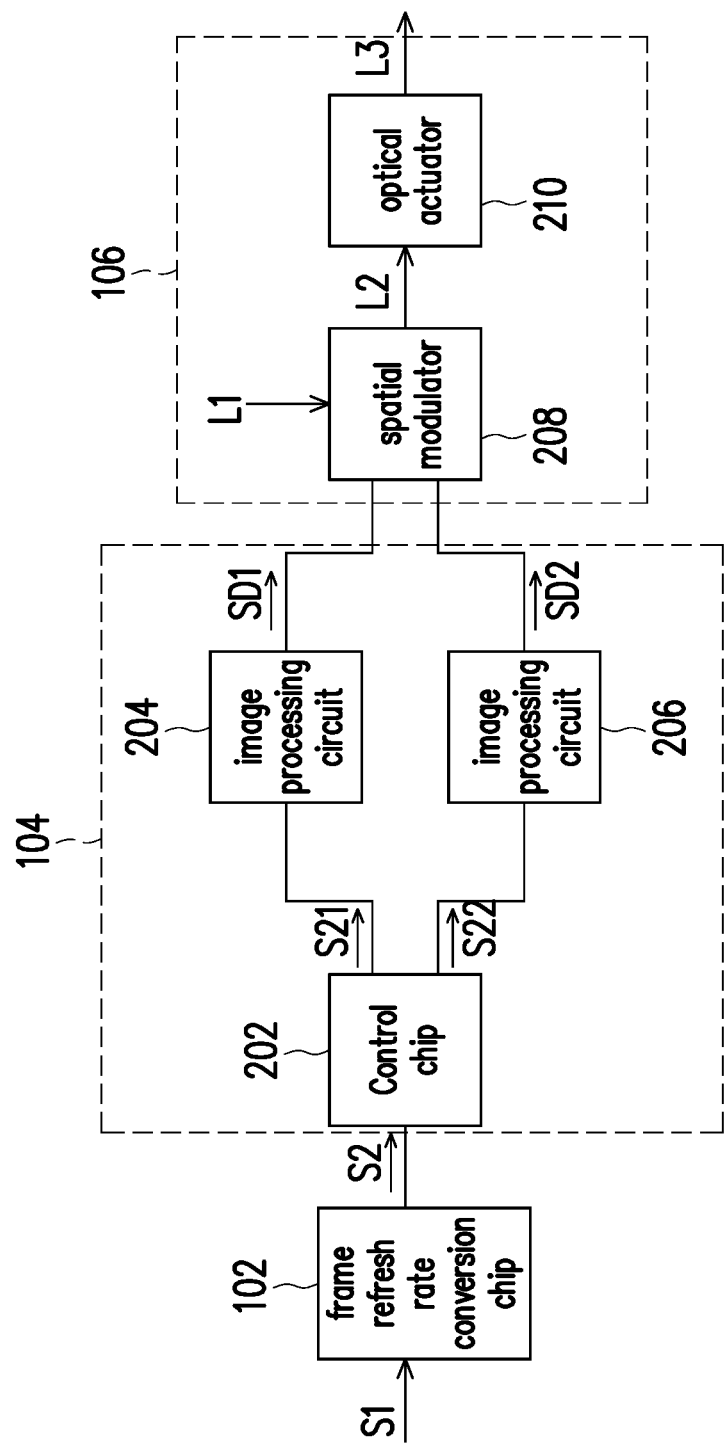
FIG. 2 is a schematic diagram of a projection apparatus according to another embodiment of the invention.

FIG. 2 is a schematic diagram of a projection apparatus according to another embodiment of the invention. Referring to FIG. 2, in the embodiment, the control circuit 104 may include a control chip 202, an image processing circuit 204 and an image processing circuit 206, and the spatial light modulation circuit 106 may include a spatial modulator 208 and an optical actuator 210. The control chip 202 is coupled to the frame refresh rate conversion chip 102, the image processing circuit 204, the image processing circuit 206 and the optical actuator 210. The image processing circuit 204 and the image processing circuit 206 are further coupled to the spatial modulator 208. The control chip 202 is, for example, a Field Programmable Gate Array (FPGA), which is, for example, implemented by a XPR3821 chip manufactured by Texas Instruments (TI), though the invention is not limited thereto, and the control chip 202 is also capable of processing the video signal with the resolution of 1080P (1920×1080 pixels) and the frame refresh rate of 240 Hz. The control chip 202 may divide the video signal S2 into a sub-video signal (a first sub-video signal) S21 and a sub-video signal (a second sub-video signal) S22, and respectively send the sub-video signals S21 and S22 to the image processing circuit 204 and the image processing circuit 206, such that the image processing circuit 204 and the image processing circuit 206 respectively generate an image signal (a first image signal) SD1 and an image signal (a second image signal) SD2 to the spatial modulator 208 according to the sub-video signal S21 and the sub-video signal S22. The image processing circuit 204 and the image processing circuit 206 are for example, implemented by DDP4422 chips manufactured by Texas Instruments (TI), though the invention is not limited thereto. For example, when the user wants to view the projected image in a higher frame refresh rate, the image signal SD1 includes a resolution (960×1080 pixels) and the frame refresh rate of 240 Hz, and the image signal SD2 includes the resolution (960×1080 pixels) and the frame refresh rate of 240 Hz. The image signal SD1 and the image signal SD2 are transmitted to the spatial modulator 208, for example, the spatial modulator 208 may present an image with the resolution of 1920×1080 pixels, so that the image signal SD1 corresponds to a left region (960×1080) of the spatial modulator 208, and the image signal SD2 corresponds to a right region (960×1080) of the spatial modulator 208.

Therefore, the spatial modulator 208 may modulate an illumination beam L1 according to the image signal SD1 and the image signal SD2 to generate a modulated light beam L2. The spatial modulator 208 is, for example, a reflective light modulator such as a Liquid Crystal on Silicon panel (LCoS panel), a Digital Micro-mirror Device (DMD), etc., or a transmissive light modulator such as a Transparent Liquid Crystal Panel, an Electro-Optical Modulator, a Magneto-Optic modulator, an Acousto-Optical Modulator (AOM), etc., though the invention is not limited thereto.

Moreover, the control chip 202 may control a swing manner of the optical actuator 210 according to the frame refresh rate of the video signal S2 to adjust an optical path of the modulated light beam L2, so as to adjust the projected image L3 to an image with a higher resolution and a lower frame refresh rate or adjust the projected image L3 to an image with a lower resolution and a higher frame refresh rate. In detail, a schematic diagram of adjusting the resolution and the frame refresh rate of the projected image L3 is as that shown in FIG. 3, where the optical actuator 210 is disposed between spatial modulator 208 and a projection lens 302, and after the illumination beam L1 is modulated by the spatial modulator 208 to form the modulated light beam L2, the control chip 202 controls the swing manner of the optical actuator 210 according to the image refresh rate of the video signal S2 to generate the projected image L3, and the projected image L3 is further projected to a projection target (for example, a wall surface or a projection screen) by the projection lens 302 to form a projected image.

Figure 3:
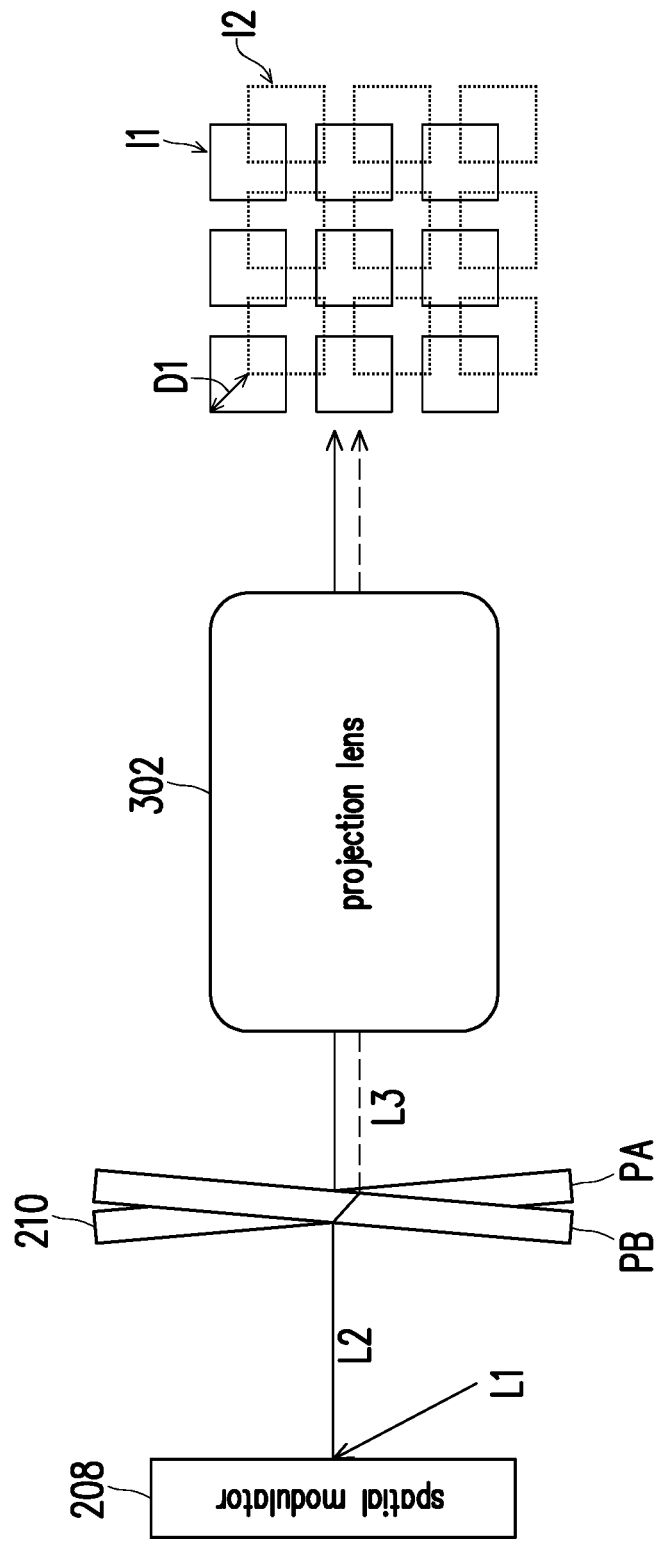
FIG. 3 is a schematic diagram of adjusting a resolution and a frame refresh rate of a projected image according to an embodiment of the invention.

For example, when the frame refresh rate of the video signal S2 is 60 Hz, the control chip 202 controls the optical actuator 210 to swing in a reciprocating manner, so as to change an optical path of the modulated light beam L2, and accordingly change a position of the projected image L3 projected on the projection target, and achieve user's viewing effects of pixel increase and image edge smoothing. As shown in FIG. 3, when the optical actuator 210 is at a position PA, the projected image L3 forms a projection pattern I1 on the projection target, and when the optical actuator 210 is at a position PB, the projected image L3 forms a projection pattern I2 on the projection target, where the projection pattern I1 and the projection pattern I2 are deviated by a distance D1. In this way, by overlapping a plurality of projection patterns with deviated positions and based on the visual persistence effect, the effects of pixel increase and image edge smoothing are achieved, so as to improve the resolution of the projected image. For example, during each frame period, the positions of the projection patterns are properly deviated to achieve the display effect of the 4K resolution.

For another example, when the frame refresh rate of the video signal S2 is 240 Hz, the control chip 202 controls the optical actuator 210 to stop swinging, and now the optical path of the modulated light beam L2 is not changed along with swing of the optical actuator 210, namely, the projected image L3 is projected to a same position on the projection target in the frame refresh rate of 240 Hz. Compared to the situation that the frame refresh rate of the video signal S2 is 60 Hz, although the resolution of the projected image L3 is not increased, the frame refresh rate of the projected image L3 is increased by 4 times.

Based on the invention, a time required for processing the video signal S1 by the projection apparatus 100 is greatly shortened, and the delay time of the image frame is shortened to 14.6 ms, which may satisfy the demand on a high frame refresh rate when the projection apparatus 100 is applied to display, for example, a game image, etc.

Figure 4:
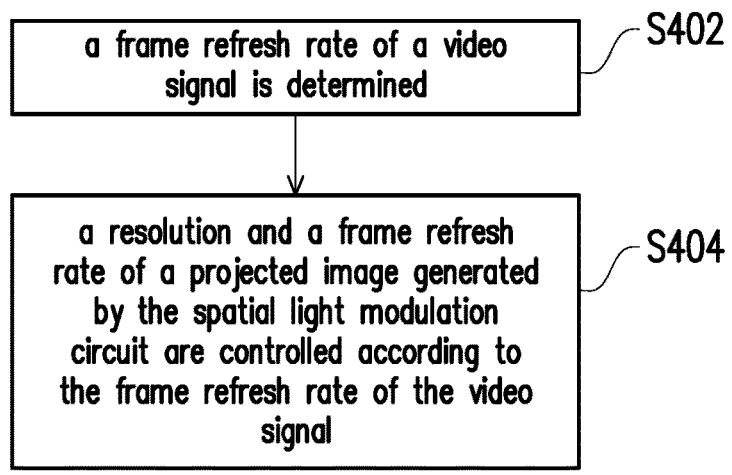
FIG. 4 is a flowchart illustrating a projection method of a projection apparatus according to an embodiment of the invention.

FIG. 4 is a flowchart illustrating a projection method of a projection apparatus according to an embodiment of the invention. According to the above embodiments, it is known that the projection method of the projection apparatus includes at least following steps. First, a frame refresh rate of a video signal is determined (step S402), and then a resolution and a frame refresh rate of a projected image generated by the spatial light modulation circuit are controlled according to the frame refresh rate of the video signal (step S404). For example, the spatial light modulation circuit is controlled to adjust the projected image to have a first resolution and a first frame refresh rate or adjust the projected image to have a second resolution and a second frame refresh rate according to the frame refresh rate of the video signal, where the first resolution is greater than the second resolution, or the first frame refresh rate is smaller than the second frame refresh rate.

Figure 5:
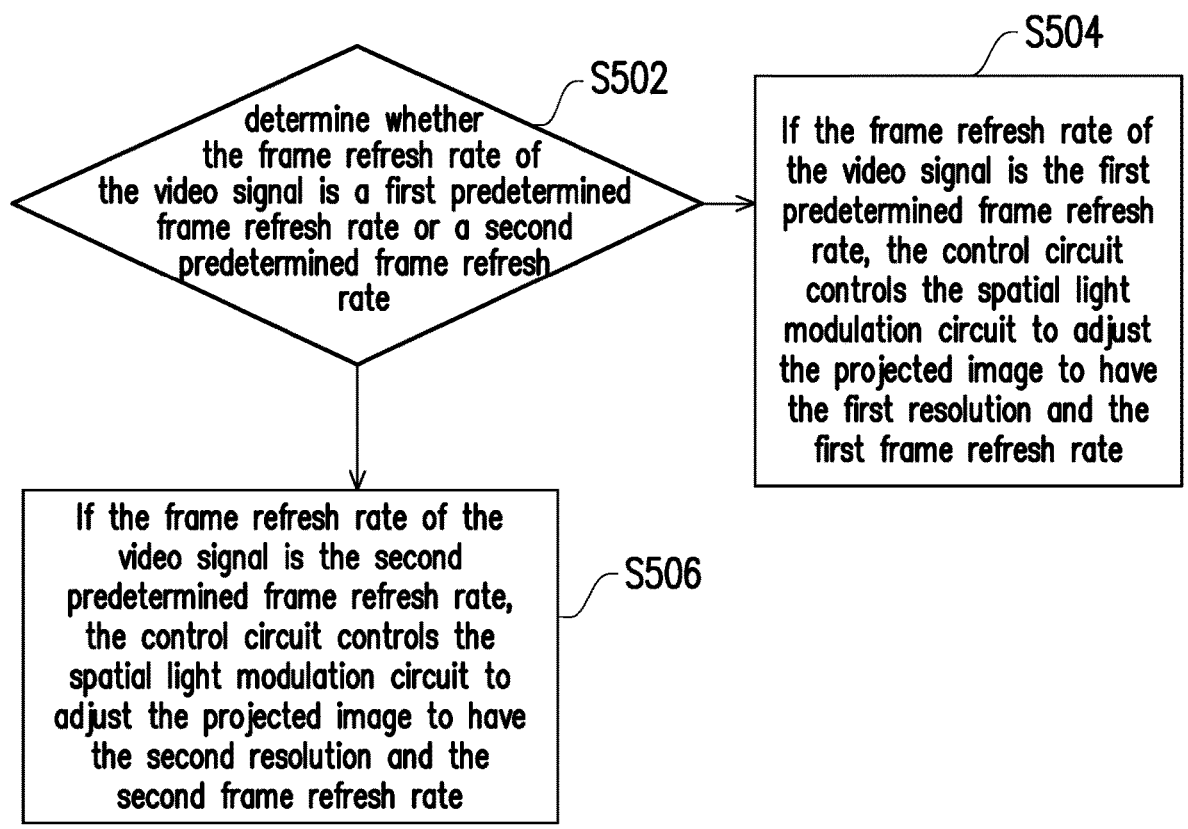
FIG. 5 is a flowchart illustrating a projection method of a projection apparatus according to another embodiment of the invention.

For example, as shown in FIG. 5, it is determined whether the frame refresh rate of the video signal is a first predetermined frame refresh rate or a second predetermined frame refresh rate (step S502), where the first predetermined frame refresh rate is smaller than the second predetermined frame refresh rate. If the frame refresh rate of the video signal is the first predetermined frame refresh rate, the control circuit controls the spatial light modulation circuit to adjust the projected image to have the first resolution and the first frame refresh rate (step S504). If the frame refresh rate of the video signal is the second predetermined frame refresh rate, the control circuit controls the spatial light modulation circuit to adjust the projected image to have the second resolution and the second frame refresh rate (step S506). Further, the spatial light modulation circuit may include an optical actuator, and by controlling the swing of the optical actuator according to the frame refresh rate of the video signal, the projected image may be adjusted to have the first resolution and the first frame refresh rate or the projected image may be adjusted to have the second resolution and the second frame refresh rate. The first predetermined frame refresh rate and the first frame refresh rate are, for example, 60 Hz, the second predetermined frame refresh rate and the second frame refresh rate are, for example, 240 Hz, the first resolution is, for example, 4096×2160 pixels, and the second resolution is, for example, 1920×1080 pixels, though the invention is not limited thereto.

In summary, in the embodiment of the invention, the control circuit is adopted to adjust the resolution and the frame refresh rate of the projected image generated by the spatial light modulation circuit according to the frame refresh rate of the video signal, so as to adjust the projection mode of the projection apparatus according to the usage demand of the user to effectively improve the usage quality of the projection apparatus.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents. Moreover, any embodiment of or the claims of the invention is unnecessary to implement all advantages or features disclosed by the invention. Moreover, the abstract and the name of the invention are only used to assist patent searching. Moreover, "first", "second", etc. mentioned in the specification and the claims are merely used to name the elements and should not be regarded as limiting the upper or lower bound of the number of the components/devices.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
   a frame refresh rate conversion chip, adapted to perform frame refresh rate conversion on a first video signal to generate a second video signal;
   a spatial light modulation circuit; and
   a control circuit, coupled to the frame refresh rate conversion chip and the spatial light modulation circuit, and adapted to adjust a resolution and a frame refresh rate of a projected image generated by the spatial light modulation circuit according to a frame refresh rate of the second video signal, wherein the control circuit controls the spatial light modulation circuit to adjust the projected image to have a first resolution and a first frame refresh rate or have a second resolution and a second frame refresh rate according to the frame refresh rate of the second video signal.

2. The projection apparatus as claimed in claim 1, wherein the control circuit adapts to control the spatial light modulation circuit to adjust the projected image to have the first resolution and the first frame refresh rate or adjust the projected image to have the second resolution and the second frame refresh rate according to the frame refresh rate of the second video signal, wherein the first resolution is greater than the second resolution, and the first frame refresh rate is smaller than the second frame refresh rate.

3. The projection apparatus as claimed in claim 1, wherein a first predetermined frame refresh rate is smaller than a second predetermined frame refresh rate.

4. The projection apparatus as claimed in claim 3, wherein the first predetermined frame refresh rate and the first frame refresh rate are 60 Hz, the second predetermined frame refresh rate and the second frame refresh rate are 240 Hz, the first resolution is 4096×2160 pixels, and the second resolution is 1920×1080 pixels.

5. The projection apparatus as claimed in claim 1, wherein the control circuit adapts to control the spatial light modulation circuit to adjust the projected image to have a first resolution and a first frame refresh rate or adjust the projected image to have a second resolution and a second frame refresh rate according to the frame refresh rate of the second video signal, wherein the first frame refresh rate is smaller than the second frame refresh rate.

6. A projection apparatus, comprising:
   a frame refresh rate conversion chip, adapted to perform frame refresh rate conversion on a first video signal to generate a second video signal;
   a control circuit; and
   a spatial light modulation circuit, comprising:
      a spatial modulator, coupled to the control circuit, and adapted to modulate a light beam to generate a modulated light beam; and
      an optical actuator, coupled to the control circuit, wherein the control circuit adapts to control swing of the optical actuator according to a frame refresh rate of the second video signal, so as to adjust a projected image to have a first resolution and a first frame refresh rate or adjust the projected image to have a second resolution and a second frame refresh rate,
   wherein the control circuit is coupled to the frame refresh rate conversion chip and the spatial light modulation circuit, and adapted to adjust a resolution and a frame refresh rate of the projected image generated by the spatial light modulation circuit according to the frame refresh rate of the second video signal.

7. The projection apparatus as claimed in claim 6, wherein the control circuit comprises:
   a control chip, coupled to the frame refresh rate conversion chip, adapted to control the swing of the optical actuator according to the frame refresh rate of the second video signal and divide the second video signal into a first sub-video signal and a second sub-video signal;
   a first image processing circuit, adapted to generate a first image signal according to the first sub-video signal; and
   a second image processing circuit, adapted to generate a second image signal according to the second sub-video signal, wherein the first image signal and the second image signal are transmitted to the spatial modulator.

8. A projection method of a projection apparatus, wherein the projection apparatus comprises a frame refresh rate conversion chip and a spatial light modulation circuit, and the projection method comprising:
   performing frame refresh rate conversion on a first video signal to generate a second video signal by the frame refresh rate conversion chip;
   determining a frame refresh rate of the second video signal; and
   controlling the spatial light modulation circuit to adjust the projected image to have a first resolution and a first frame refresh rate or have a second resolution and a second frame refresh rate according to the frame refresh rate of the second video signal.

9. The projection method of the projection apparatus as claimed in claim 8, further comprising:
controlling the spatial light modulation circuit to adjust the projected image to have the first resolution and the first frame refresh rate or adjust the projected image to have the second resolution and the second frame refresh rate according to the frame refresh rate of the second video signal, wherein the first resolution is greater than the second resolution, and the first frame refresh rate is smaller than the second frame refresh rate.

10. The projection method of the projection apparatus as claimed in claim 8,
wherein a first predetermined frame refresh rate is smaller than a second predetermined frame refresh rate.

11. The projection method of the projection apparatus as claimed in claim 10, wherein the first predetermined frame refresh rate and the first frame refresh rate are 60 Hz, the second predetermined frame refresh rate and the second frame refresh rate are 240 Hz, the first resolution is 4096× 2160 pixels, and the second resolution is 1920×1080 pixels.

12. The projection method of the projection apparatus as claimed in claim 8, further comprising:
controlling the spatial light modulation circuit to adjust the projected image to have a first resolution and a first frame refresh rate or adjust the projected image to have a second resolution and a second frame refresh rate according to the frame refresh rate of the second video signal, wherein the first frame refresh rate is smaller than the second frame refresh rate.

13. A projection method of a projection apparatus, wherein the projection apparatus comprises a frame refresh rate conversion chip and a spatial light modulation circuit, the spatial light modulation circuit comprises an optical actuator, and the projection method comprising:
performing frame refresh rate conversion on a first video signal to generate a second video signal by the frame refresh rate conversion chip;
determining a frame refresh rate of the second video signal; and
controlling swing of the optical actuator according to the frame refresh rate of the second video signal, so as to adjust the projected image to have a first resolution and a first frame refresh rate or adjust the projected image to have a second resolution and a second frame refresh rate.

\* \* \* \* \*